(12) United States Patent
Mitran et al.

(10) Patent No.: US 9,229,725 B2
(45) Date of Patent: Jan. 5, 2016

(54) SAFE CONDITIONAL-LOAD AND CONDITIONAL-STORE OPERATIONS

(71) Applicant: International Business Machines Corporation, Armonk, NY (US)

(72) Inventors: Marcel Mitran, Markham (CA); Visda Vokhshoori, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/482,642

(22) Filed: Sep. 10, 2014

(65) Prior Publication Data

US 2015/0121049 A1    Apr. 30, 2015

(30) Foreign Application Priority Data

Oct. 31, 2013 (CA) ..................................... 2831711

(51) Int. Cl.
*G06F 9/45* (2006.01)
*G06F 9/38* (2006.01)
*G06F 9/46* (2006.01)

(52) U.S. Cl.
CPC ............ *G06F 9/3861* (2013.01); *G06F 9/3804* (2013.01); *G06F 9/46* (2013.01)

(58) Field of Classification Search
USPC .................. 717/140–144, 158–160, 150–152
IPC ............................... G06F 8/40,8/41, 8/53, 8/447
See application file for complete search history.

(56) References Cited

U.S. PATENT DOCUMENTS

| | | | |
|---|---|---|---|
| 5,790,867 A * | 8/1998 | Schmidt et al. ............... | 717/155 |
| 6,427,234 B1 * | 7/2002 | Chambers et al. ............ | 717/140 |
| 6,536,037 B1 * | 3/2003 | Guheen et al. ................ | 717/151 |
| 6,993,757 B2 * | 1/2006 | Rajagopalan .................. | 717/160 |
| 7,051,322 B2 * | 5/2006 | Rioux ............................ | 717/143 |
| 7,240,343 B2 * | 7/2007 | Ogasawara .................... | 717/158 |
| 7,257,806 B1 * | 8/2007 | Chen et al. .................... | 717/141 |
| 7,552,428 B2 * | 6/2009 | Stoodley et al. .............. | 717/148 |
| 7,574,704 B2 * | 8/2009 | Fulton et al. .................. | 717/159 |
| 7,747,989 B1 * | 6/2010 | Kissell .......................... | 717/148 |
| 7,996,671 B2 * | 8/2011 | Chheda et al. ................ | 713/164 |
| 8,078,850 B2 | 12/2011 | Kuesel et al. | |

(Continued)

OTHER PUBLICATIONS

Bronevetsky et al, "Compiler-Enhanced Incremental Checkpointing for OpenMP Applications", ACM, pp. 275-276, 2008.*

(Continued)

*Primary Examiner* — Anil Khatri
(74) *Attorney, Agent, or Firm* — Cantor Colburn LLP; Edward Choi

(57) ABSTRACT

One embodiment is a computer-implemented method for safe conditional operation when storage access cannot be proven safe. The method includes receiving a portion of source code for a transaction by an enhanced compiler and. The portion of source code received is analyzed, by the enhanced compiler, to determine whether the portion of source code is a candidate for transformation. Responsive to a determination that the portion of source code analyzed by the enhanced compiler is a candidate for transformation, the portion of the source code analyzed is transformed, by a computer processor, to use a conditional operation in a first portion of the transformed code. The conditional operation uses hardware transaction memory to invoke retry operations within hardware. A branch is added, directed to an original code portion, in a second portion of transformed code, where the branch is a recovery portion containing the original code portion.

17 Claims, 7 Drawing Sheets

(56) References Cited

U.S. PATENT DOCUMENTS

| | | | |
|---|---|---|---|
| 8,108,844 B2* | 1/2012 | Crutchfield et al. | 717/149 |
| 8,136,102 B2* | 3/2012 | Papakipos et al. | 717/140 |
| 8,180,986 B2 | 5/2012 | Harris et al. | |
| 8,397,222 B2* | 3/2013 | Warren | 717/143 |
| 8,429,637 B2* | 4/2013 | Myles et al. | 717/159 |
| 8,438,551 B2* | 5/2013 | Tonkin et al. | 717/144 |
| 8,458,684 B2* | 6/2013 | Eichenberger et al. | 717/159 |
| 8,615,745 B2* | 12/2013 | Blainey et al. | 717/140 |
| 8,726,251 B2* | 5/2014 | Kalogeropulos et al. | 717/150 |
| 8,869,120 B2* | 10/2014 | Huuck et al. | 717/140 |
| 2011/0119446 A1 | 5/2011 | Blumrich et al. | |
| 2011/0219208 A1 | 9/2011 | Asaad et al. | |
| 2011/0307689 A1 | 12/2011 | Chung et al. | |

OTHER PUBLICATIONS

Lee et al, "Enhanced Hot Spot Detection Heuristics for Embedded Java Just-in-Time Compilers", ACM, pp. 13-22, 2008.*

Denny et al, "Enhancing Syntax Error Messages Appears Ineffectual", ACM, pp. 273-278, 2014.*

Hoflehner et al, "Compiler Optimizations for Transaction Processing Workloads on Itanium® Linux Systems" IEEE, pp. 1-10, 2004.*

Tilevich et al, "Program, Enhance Thyself!"—Demand-Driven Pattern-Oriented Program Enhancement ACM, pp. 13-24, 2008.*

Wang et al, "Compiler-Managed Software-based Redundant Multi-Threading for Transient Fault Detection", IEEE, pp. 1-13, 2007.*

Anonymously; "Apparatus for Interleaving Execution of Distinct Conditional Branches using Multidimensional Condition Registerss"; An IP.com Prior Art Database Technical Disclosure; http://iip.com/IPCOM/000214881; Feb. 8, 2012. 5 pgs.

Mengjie Mao et al., "Distributed Control Independence for Composable Multi-processors," icis, pp. 124-129, 2012 IEEE/ACIS 11th International Conference on Computer and Information Science, 2012.

* cited by examiner

Safe conditional operation system
116

SAFE CONDITIONAL-LOAD AND CONDITIONAL-STORE OPERATIONS

FOREIGN PRIORITY

This application claims priority to Canadian Patent Application No. 2831711, filed 31 Oct. 2013, and all the benefits accruing therefrom under 35 U.S.C. §119, the contents of which in its entirety are herein incorporated by reference

BACKGROUND

This disclosure relates generally to conditional-load and conditional-store operations in a data processing system and, more specifically, to performing safe conditional-load and conditional-store operations in conditions when storage access cannot be proven safe in the data processing system.

Conditional operations in the form of LOAD_ON_COND and STORE_ON_COND operations typically provide a significant performance advantage for data-driven branches that are difficult for branch predictors of program code compilers to predict reliably. In some instances, LOAD_ON_COND and STORE_ON_COND operations can provide fairly dramatic improvements to the performance of a program because penalties☐associated with mispredicted branches are removed.

For example, using the following code snippet representative of a common code pattern for a LOAD_ON_COND operation of:

```
x = 0;
if (a > 10)       ## data-driven and poorly
predicted
{
x = *ptr;
}
``` a typical implementation of the code snippet is:

```
LOAD_IMM    Rx, 0           ## x=0
COMPARE     Ra, 10          ## Cond <= (Ra > 10)
BRANCH      GT, Label       ## Branch is poorly
predicted
LOAD        Rx, 0(Rptr)     ## Load *ptr into X
Label:
```

The typical implementation can be further transformed into a reduced form of:

```
LOAD_IMM      Rx, 0            ## x=0
COMPARE       Ra, 10;☐         ##☐
LOAD_ON_COND  Rx, GT, 0(Rptr)  ## Load *ptr into X if Ra
>10
```

The transformation thereby avoids the branch prediction through predication of the assignment of *ptr to x.

There is however an important limitation to the use of the transformation. The LOAD_ON_COND can only be used safely in situations in which the source of the load is proven to not cause an access violation independently of an outcome of the conditional operation. Implementations of LOAD_ON_COND typically perform the load operation implicitly independent of the respective condition and, accordingly, cause an access violation even when the respective condition for the load is false. For example, in the following implementation:

```
LOAD_IMM      Rt, 1
COMPARE       Rptr, NULL       ## sets condition code☐
LOAD_ON_COND  Rt, NE, 0(Rptr)  ## Loads value at storage
                               location 0(Rptr) into Rt
                               condition code NE
``` an access violation will occur on systems where page 0 is not readable when Rptr is NULL.

For a Load-on-Condition transformation to work correctly, a compiler must therefore have sufficient contextual information about *ptr to prove that the source of the load will not cause an illegal access exception independently of whether the respective condition for the load is true or false.

In a similar manner a Store-on-Condition can only be used safely in situations in which a location into which a storing operation is performed does not cause an access violation. For example, using the following implementation:

```
MOVE           0(array),H'0'
COMPARE        Ra, 10
STORE_ON_COND  Rx, GT, 0(array)
```

When the address of the array variable is invalid, an access violation will occur on systems using the example implementation.

Some previous attempted solutions use hardware transaction memory, as a mechanism to detect bad access to the physical memory. In another example of previous attempted solutions, a technique in which speculative elimination of null checks in regions is used. However, the technique is only useful in the presence of a virtual memory subsystem, such as used in an implementation of a Java virtual machine to detect null references. In another previous attempted solution, new hardware logic is utilized to improve branch prediction.

SUMMARY

One embodiment is a computer-implemented method for safe conditional operation when storage access cannot be proven safe. The method includes receiving a portion of source code for a transaction by an enhanced compiler and. The portion of source code received is analyzed, by the enhanced compiler, to determine whether the portion of source code is a candidate for transformation. Responsive to a determination that the portion of source code analyzed by the enhanced compiler is a candidate for transformation, the portion of the source code analyzed is transformed, by a computer processor, to use a conditional operation in a first portion of the transformed code. The conditional operation uses hardware transaction memory to invoke retry operations within hardware. A branch is added, directed to an original code portion, in a second portion of transformed code, where the branch is a recovery portion containing the original code portion.

Another embodiment is a computer program product for safe conditional operation when storage access cannot be proven safe. The computer program product includes a computer readable storage medium having program instructions embodied therewith. The program instructions are executable by a computer processor to cause the computer processor to perform a method. The method includes receiving a portion of source code for a transaction by an enhanced compiler and. The portion of source code received is analyzed, by the enhanced compiler, to determine whether the portion of source code is a candidate for transformation. Responsive to a determination that the portion of source code analyzed by the enhanced compiler is a candidate for transformation, the portion of the source code analyzed is transformed to use a conditional operation in a first portion of the transformed code. The conditional operation uses hardware transaction memory to invoke retry operations within hardware. A branch is added, directed to an original code portion, in a second portion of transformed code, where the branch is a recovery portion containing the original code portion.

Yet another embodiment is an apparatus for safe conditional operation when storage access cannot be proven safe. The apparatus includes a communications fabric; a memory connected to the communications fabric, where the memory contains computer executable program code; and a processor unit connected to the communications fabric, where the processor unit executes the computer executable program code to perform a method. The method includes receiving a portion of source code for a transaction by an enhanced compiler and. Further according to the method, the portion of source code received is analyzed, by the enhanced compiler, to determine whether the portion of source code is a candidate for transformation. Responsive to a determination that the portion of source code analyzed by the enhanced compiler is a candidate for transformation, the portion of the source code analyzed is transformed to use a conditional operation in a first portion of the transformed code. The conditional operation uses hardware transaction memory to invoke retry operations within hardware. A branch is added, directed to an original code portion, in a second portion of transformed code, where the branch is a recovery portion containing the original code portion.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
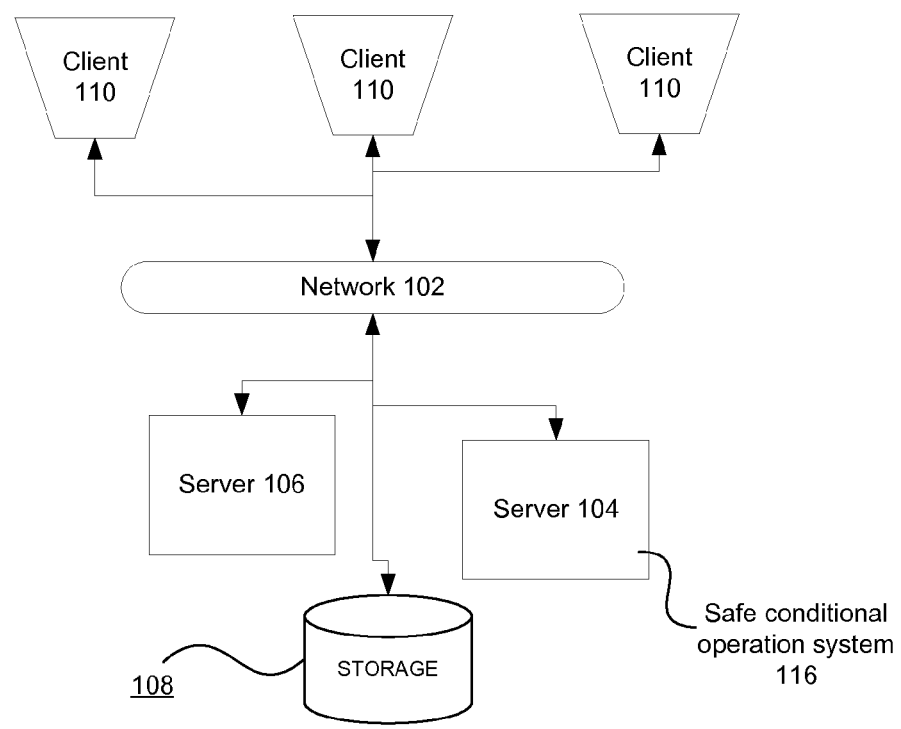
FIG. 1 is a block diagram of a network data processing system, according to some embodiments of the disclosure.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer-readable data storage devices may be utilized. A computer-readable data storage device may be, for example, but not limited to, an electronic, magnetic, optical, or semiconductor system, apparatus, or device, or any suitable combination of the foregoing, but does not encompass propagation media. More specific examples (a non-exhaustive list) of the computer-readable data storage devices would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device or any suitable combination of the foregoing, but does not encompass propagation media. In the context of this document, a computer-readable data storage device may be any tangible device that can store a program for use by or in connection with an instruction execution system, apparatus, or device.

Computer program code for carrying out operations for aspects of the present disclosure may be written in any combination of one or more programming languages, including an object oriented programming language such as Java®, Smalltalk, C++, or the like and conventional procedural programming languages, such as the "C" programming language or similar programming languages. Java and all Java-based trademarks and logos are trademarks of Oracle Corporation, and/or its affiliates, in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable data storage device that can direct a computer or other programmable data processing apparatus to function in a particular manner, such that the instructions stored in the computer readable data storage device produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Figure 2:
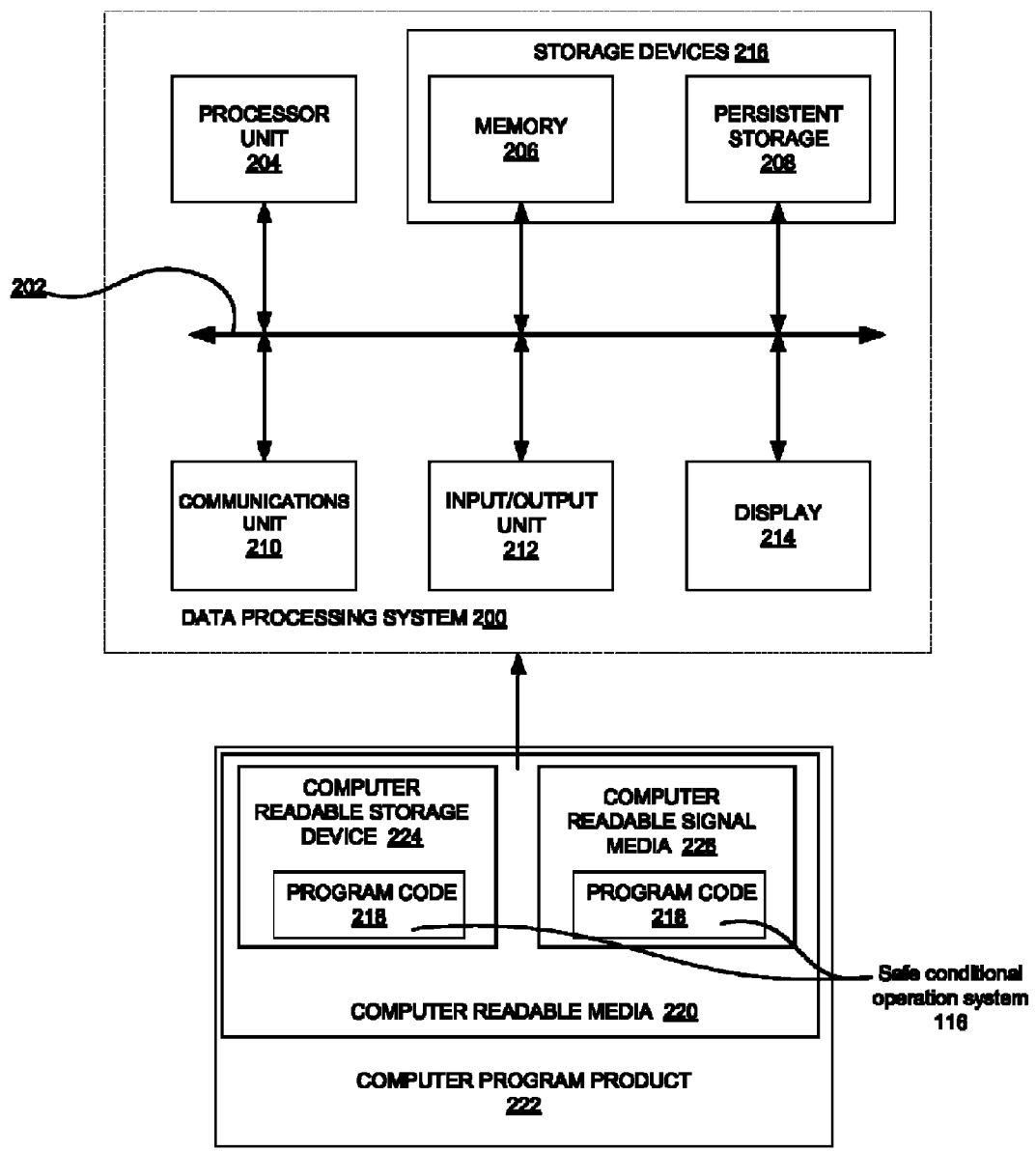
FIG. 2 is a block diagram of a data processing system, according to some embodiments of the disclosure.

With reference now to the figures and, in particular, with reference to FIGS. 1-2, exemplary diagrams of data processing environments are provided in which illustrative embodiments may be implemented. It should be appreciated that FIGS. 1-2 are only illustrative and are not intended to assert or imply any limitation with regard to the environments in which different embodiments may be implemented. Many modifications to the depicted environments may be made.

FIG. 1 shows a pictorial representation of a network data processing system 100 in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wired, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114 including safe conditional operation system 116. Clients 110, 112, and 114 are clients to server 104 in this example. Network data processing system 100 may include additional servers, clients, and other devices not shown. Safe conditional operation system 116 is a representative embodiment of the disclosure providing a capability to perform safe conditional-load and conditional-store operations in conditions when storage access cannot be proven safe in network data processing system 100 using server 104.

In the depicted example, network data processing system 100 is the Internet, with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference to FIG. 2, a block diagram of an exemplary data processing system operable for various embodiments of the disclosure is presented. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206. The computer-implemented instructions also contain instructions comprising safe conditional operation system 116 to be loaded into memory 206 for execution by processor unit 204.

These instructions are referred to as program code, computer usable program code, or computer readable program code that may be read and executed by a processor in processor unit 204. The program code in the different embodiments may be embodied on different physical or tangible computer readable storage media, such as memory 206 or persistent storage 208 of storage devices 216.

Program code 218 is located in a functional form on computer readable media 220 that is in a computer readable medium form selectively removable and may be loaded onto or transferred to data processing system 200 for execution by processor unit 204. Program code 218 and computer readable media 220 form computer program product 222 in these examples. In one example, computer readable media 220 may be in a non-transitory and tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 220 also may take the form of a persistent storage, such as a hard drive, a thumb drive, or a flash memory that is connected to data processing system 200. The tangible form of computer readable media 220 is also referred to as computer recordable storage media or a computer readable storage device 224 in which data is non-transitory and therefore does not form a propagation medium containing transitory signals. In some instances, computer readable media 220 may not be removable.

Alternatively, program code 218 may be transferred to data processing system 200 from computer readable media 220 through a communications link to communications unit 210 and/or through a connection to input/output unit 212 as computer readable signal media 226, which is in a transitory form. The communications link and/or the connection may be physical or wireless in the illustrative examples.

In some illustrative embodiments, program code 218 may be downloaded over a network to persistent storage 208 from another device or data processing system for use within data processing system 200. For instance, program code stored in a computer readable data storage device in a server data processing system may be downloaded over a network from the server to data processing system 200. The data processing system providing program code 218 may be a server computer, a client computer, or some other device capable of storing and transmitting program code 218. In the current example, program code 218 contains safe conditional operation system 116 of FIG. 1.

Using data processing system 200 of FIG. 2 as an example, a computer-implemented process for safe conditional operation when storage access cannot be proven safe is presented. Processor unit 204 receives a portion of source code for a transaction and analyzes the portion of source code received, using an enhanced compiler to determine whether the portion of source code analyzed by the enhanced compiler is a candidate for transformation. Responsive to a determination that the portion of source code analyzed is a candidate for transformation, the portion of source code analyzed is transformed by processor 204 using the enhanced compiler to use a conditional operation in a first portion of transformed code. A respective conditional operation uses hardware transaction memory to invoke retry operations within hardware, and a branch is added, directed to an original code portion, in a second portion of transformed code. The code of the branch is a recovery portion containing the original code portion.

Embodiments of the disclosure accordingly provide a capability to remove inhibitors to generate branch-less code. When using embodiments of the disclosure, usage of either of a LOAD_ON_COND or a STORE_ON_COND operation is no longer inhibited by a possibility that the conditional load or conditional store operation may cause an invalid access. Overhead associated with determining usage of these conditional operations is eliminated, because embodiments of the disclosure provide a correct result. Embodiments of the disclosure use a hardware transaction memory capability of retry on failure to provide the needed correctness and are applicable to static compilers.

Prior attempted solutions in which speculative elimination of null checks in regions is successful only in the presence of a Java Virtual Machine (JVM) virtual memory subsystem, to detect null references and applicable to dynamic compilers, do not solve an issue with programs heavily gated by the data driven branch code.

Other attempted solutions focus on hardware with a smaller footprint to reduce costs and generate less heat but do not address the speculation with correctness issue. In contrast, embodiments of the disclosure may be provided as program code of a software program to improve run-time performance by avoiding instances of potential branch misprediction, in locations of the code, where elimination of the branch operation would risk data integrity of the program.

Embodiments of the disclosure provide a capability to relax a requirement of checking a condition and ensuring the conditional load/store operation is safe. The embodiments accordingly use capabilities of hardware transaction memory to enable more aggressive code optimization of the compiled code. Embodiments of the disclosure therefore enable more aggressive ways for the compiler to not generate data dependent branches having a high probability of a misprediction. In an example, use of an embodiment of the disclosure provides added capability to enable speculative code motion. Cost of using the hardware transaction memory is compared to savings from allowing speculation to determine whether a net result of using the hardware transaction memory provides a benefit. Embodiments of the disclosure may accordingly be used on any architecture that supports hardware transaction memory.

Transactional memory accordingly provides a framework by which illegal access exceptions can be caught safely. As such, according to some embodiments, transactional memory can be used to relax requirements on a compiler to prove the source of either a LOAD_ON_COND or a STORE_ON_COND will not cause an illegal exception, hence enabling a more aggressive use of LOAD_ON_COND and STORE_ON_COND operations to avoid a potential branch misprediction involving a data-dependent branch.

Figure 3:
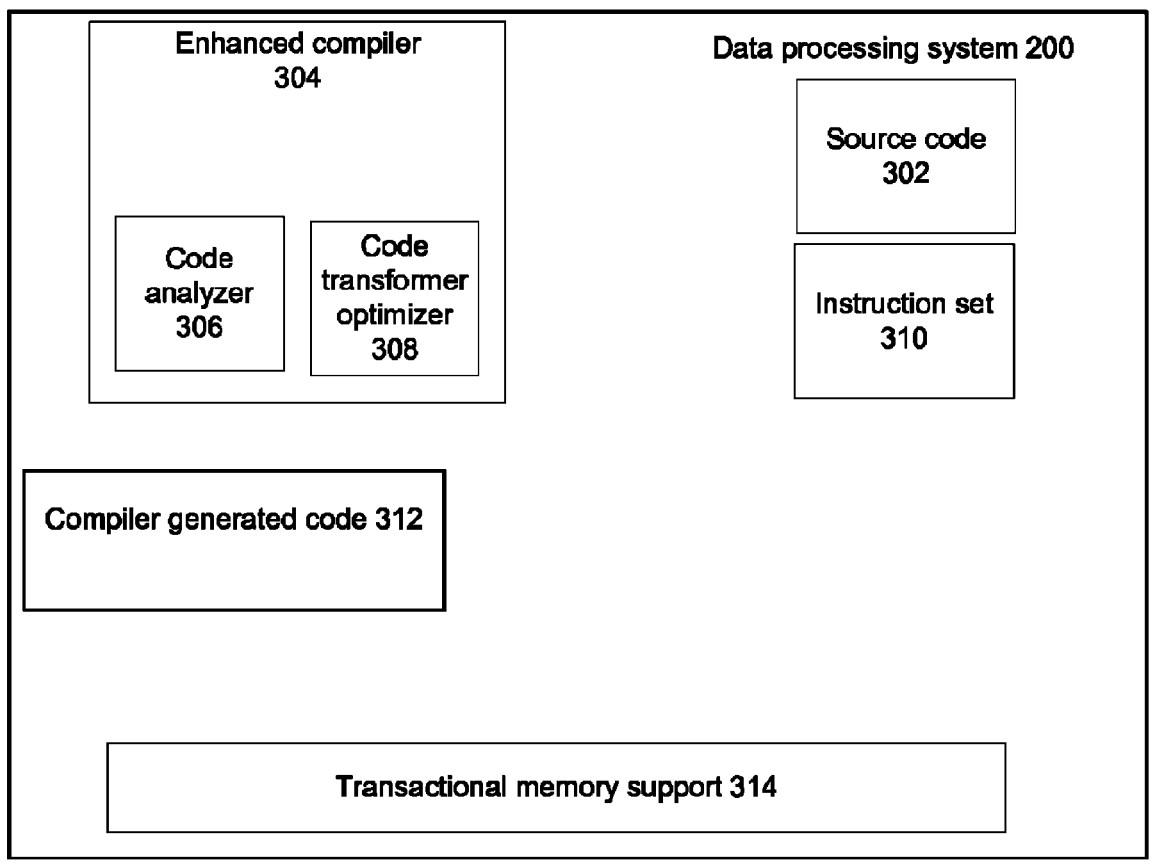
FIG. 3 is a block diagram of a safe conditional operation system, according to some embodiments of the disclosure.

With reference to FIG. 3, a block diagram of a safe conditional operation system, according to some embodiments, is presented. The example depicts a view of a possible implementation structure of the safe conditional operation system 116 in the context of data processing system 200 of FIG. 2.

Safe conditional operation system 116, as depicted, may contain more or less components than illustrated as a matter of implementation without loss of function. For example, components may be combined to reduce the number of separate components without compromising function of the components. The components provided support a compile time and a run time mode of operation while leveraging the underlying support of the data processing upon which the components depend. The components operate in an interdependent context to deliver the set of capabilities disclosed.

Source code 302 represents the fundamental input to the processing in the safe conditional operation system 116. Source code 302 is programming instructions provided for compilation by enhanced compiler 304. The source code as provided includes recognized patterns of branching, which means branching instructions are present in the segments or portions of source code provided. The patterns within the received code are detectable by processing using enhanced compiler 304 during one or more steps of compilation. The segments or portions of source code represent program code, which may be in a high level language, script language or other form of program instruction.

Enhanced compiler 304 provides a capability to compile source code 302 received as input. Enhanced compiler 304 performs functions typically associated with an optimizing compiler, including capabilities of code analyzer 306 and code transformer optimizer 308. Code analyzer 306 as a component or function of enhanced compiler 304 provides a capability of detecting one or more predetermined patterns of branching, and of representing branching instructions present in one or more segments or portions of source code provided.

In response to detection of one or more predetermined patterns of branching (or a conventional use of a conditional operation) by code analyzer 306, a code segment containing the branching operation detected is identified for further processing. Code transformer optimizer 308 processes the identified code segment containing the branching operation detected. Code transformer optimizer 308 performs a transformation in which the identified code segment is modified to enable more aggressive ways for the compiler to not generate data dependent branches having a high probability of a misprediction. In some embodiments, the transformation occurs within the compiler optimizer engine of enhanced compiler 304.

For example, the transformation may use transactional memory to relax requirements on enhanced compiler 304, to prove that the source of either a LOAD_ON_COND or a STORE_ON_COND will not cause an illegal exception. This may enable a more aggressive use of LOAD_ON_COND and STORE_ON_COND operations to avoid a potential branch misprediction involving a data-dependent branch in the identified code segment. The hardware transaction memory capability of retry on failure is used to provide correctness of a resulting operation. The transformed code includes a branch-out of a failing transaction when the transaction fails. The branch-out is to a recovery code segment incorporating the original branch code.

The combination of code analyzer 306 and code transformer optimizer 308 therefore identifies opportunities in the parsed source code to use hardware transaction memory in combination with a branch recovery segment using the original branching code. When the conditional operation uses the hardware transaction memory of the transformed segment of code, a potential branch misprediction involving a data-dependent branch in the identified code segment is avoided.

Compiler generated code 312 provides a capability to determine whether execution flow and output of the executed code is as expected. For example, and not by way of limitation, determining whether a transaction including transformed code portion will fail.

Instruction set 310 provides a capability for programs, such as those provided as input in source code 302, to use instructions specifically of conditional operations including a LOAD_ON_COND instruction or a STORE_ON_COND instruction.

Hardware transaction memory capabilities are provided using transactional memory support 314. In some embodiments, hardware transaction memory is provided as a system service or a platform service. The hardware transaction memory support includes a capability of retry on failure without programmatic intervention.

Figure 4:
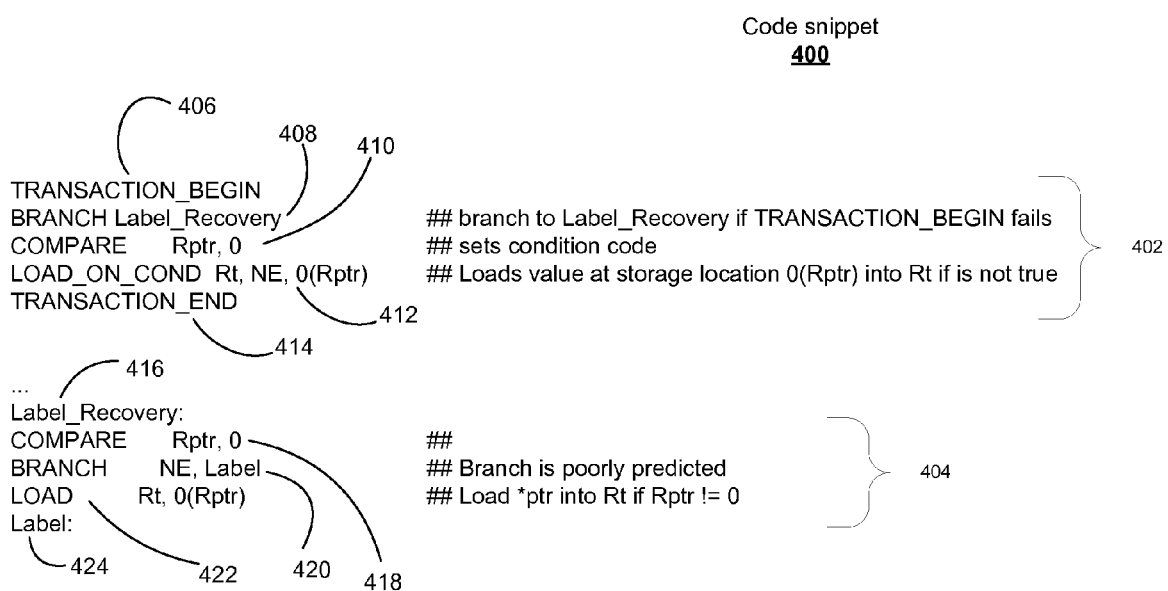
FIG. 4 is a code snippet representation of transaction including a conditional operation, according to some embodiments of the disclosure.

With reference to FIG. 4, a code snippet representation of transaction, including a conditional operation as used in various embodiments of the disclosure, is presented. The example of code snippet 400 depicts a view of a possible implementation of a conditional operation within a transaction and a recovery branch as used with safe conditional operation system 116 of FIG. 3.

Statements 402 represent a code segment of a transaction comprising a set of instructions, including a branch to a particular recovery code segment and a conditional operation. Statements 404 represent a code segment of the original branching implementation of the code. Statements 402 and 404 represent the result of a code transformation of the original branching implementation of the code, using a combination of code analyzer 306 and code transformer 308 of FIG. 3.

Statement 406 identifies the start of the code portion defining the transaction and is bounded by a corresponding statement 414 indicating an end of the defined transaction.

Statement 408 represents a directed branch-out of the transaction routine to a particular recovery segment of code identified as Label_Recovery. The associated comment indicates the branch is to be taken when the identified transaction fails. The recovery path can then execute the original branching implementation of the code.

Statement 410 specifies a particular condition code is to be set, which is used in a subsequent conditional operation. Statement 412 is a conditional operation. Statement 412 indicates that a load operation uses a value at a storage location identified by 0(Rptr) into another storage location of Rt, if the condition tested is not true.

Either a LOAD_ON_COND instruction or a STORE_ON_COND instruction can now be used speculatively inside the defined transaction. The recovery path can execute the original branching implementation of the code.

Statement 416 specifies Label_Recovery: corresponding with the directed branch out of the transaction routine indicated in statement 408. Statement 418 is the same as statement 410, which specifies the particular condition code to be set, which in this instance is used in a subsequent unconditional operation.

Statement 420 specifies a branch instruction as originally provided. The associated comments indicate this instance of a branch is poorly predicted.

Statement 422 specifies an unconditional operation in the form of a LOAD instruction. As indicated in the associated comment, the unconditional load instruction causes the loading of *ptr into the location Rt if the value of Rptr is not equal to zero. A variable that stores a reference to another variable is called a pointer, and a pointer is used to "point to" a particular variable whose reference is stored. Using a pointer enables direct access to the value stored in the variable, which is pointed to (i.e., referenced by) the particular pointer. To accomplish this, the identifier of the pointer is preceded with an asterisk (*), which acts as a dereference operator. The *ptr is literally translated as "value pointed by".

Statement 424 specifies a target of the original branch instruction specified in statement 420.

Figure 5:
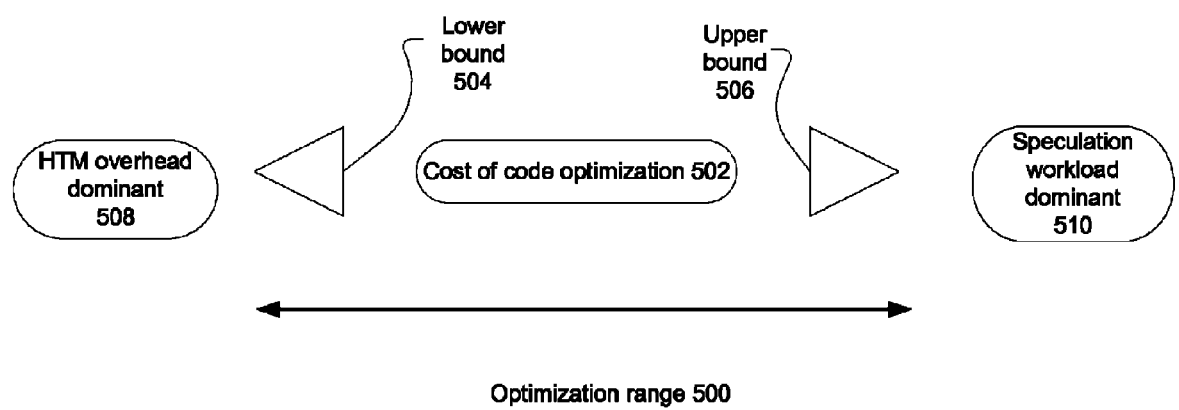
FIG. 5 is a representation of an optimization range for use of a conditional, according to some embodiments of the disclosure.

With reference to FIG. 5, a representation of an optimization range for use of a conditional operation, as used in various embodiments of the disclosure, is presented. The example of optimization range 500 depicts scope of a possible implementation of a conditional operation within a transaction and a recovery branch as used with safe conditional operation system 116 of FIG. 3.

Optimization range 500 depicts scope of a possible implementation of a conditional operation in which the cost of using the hardware transaction memory is compared to savings from allowing speculation to determine whether a net result of using the hardware transaction memory provides a benefit. Cost of code optimization 502 represents a combination of using hardware transaction memory, which includes an inherent overhead, and use of speculation inherent in the misprediction of branch operations.

Cost of code optimization 502 is bounded by lower bound 504 and upper bound 506. Lower bound 504 reflects a point at which hardware transaction memory (HTM) overhead dominant 508 represents a significant portion of the cost of code optimization. For example, using hardware transaction memory incurs processing overhead, which is too costly in view of any benefit received. This may occur when a branch is too unpredictable or when a branch operation is known to wait too long when using a conditional operation and is a candidate for a code redesign. Speculation dominant workload 510 represents a situation when speculation becomes less desirable due to the uncertain nature of the branching code. Statistics from code traces of identified code segments can be used to provide quantitative analysis of branching activity. From the analysis, optimization opportunities may be further filtered to determine points at which hardware transaction memory or speculation may or may not be beneficial, and therefore identify which approach to use.

Figure 6:
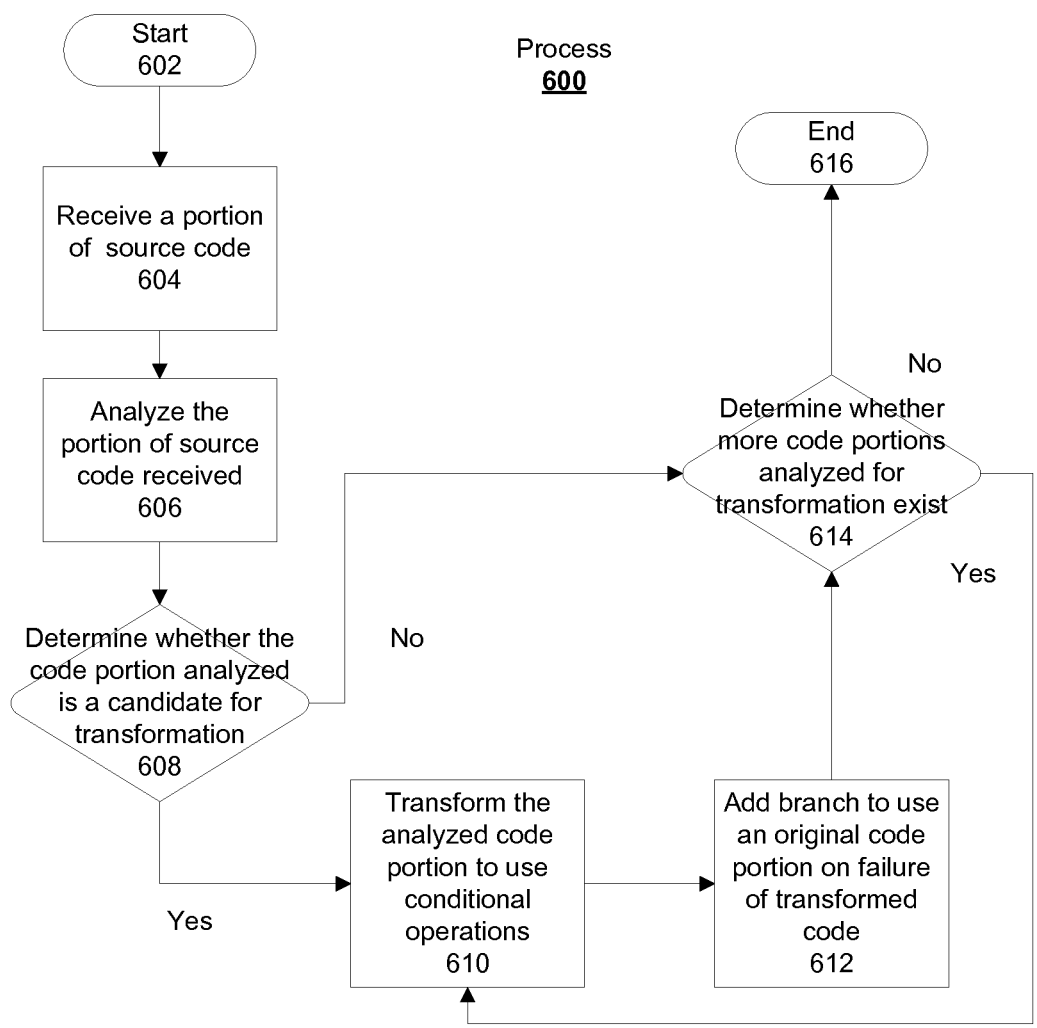
FIG. 6 is a flowchart of a process of generating a safe conditional operation code portion, according to some embodiments of the disclosure.

With reference to FIG. 6 a flowchart of a method of generating a safe conditional operation code portion, as used in various embodiments of the disclosure, is presented. Method 600 is an example of using the safe conditional operation system of FIG. 3.

Method 600 begins (block 602) and receives a portion of source code. The source code is representative of a program for which an optimization is desired and which contains branch operations. The branching operations will be examined for potential use of conditional operations and a recovery code segment.

Method 600 analyzes the portion of source code received. Analysis is conducted typically during a parsing phase to identify predetermined patterns of branching (or a conventional use of a conditional operation). The analysis may be performed by a component such as code analyzer 306 of FIG. 3 or other component suited to parse and examine source code for particular sequences of code or operational instructions or combinations thereof.

Method 600 determines whether the code portion analyzed is a candidate for transformation (block 608). A determination is made as to whether the analyzed portion contains a predetermined pattern of branching or a conventional use of a conditional operation as a result of the analysis. A determination can be made using a simple comparison of a statement in the portion of source code with that of a particular known pattern including a BRANCH instruction.

In response to a determination that the code portion analyzed is not a candidate for transformation, method 600 determines whether more code portions analyzed for transformation exist (block 614). In response to a determination that no more code portions analyzed for transformation exist, method 600 terminates (block 616).

Returning to block 608, in response to a determination that the code portion analyzed is a candidate for transformation, method 600 transforms the analyzed code portion to use conditional operations. The code transformation method retains the condition setting code of the original code portion and replaces the unconditional operation (such as a load operation or a store operation) with a corresponding conditional operation. The corresponding conditional operation uses hardware transaction memory to invoke retry operations within the hardware.

Method 600 adds branching to use the original code portion upon failure of the transformed code (block 612). The branch is from the segment including the conditional operation code portion of the transformed code to a recovery segment including the original branching code. The original branching code is a target upon failure of the conditional operation of the transformed code.

Method 600 determines whether more code portions analyzed for transformation exist (block 614) as before. In response to a determination that more code portions analyzed for transformation exist, method 600 returns to perform block 610 as before.

Figure 7:
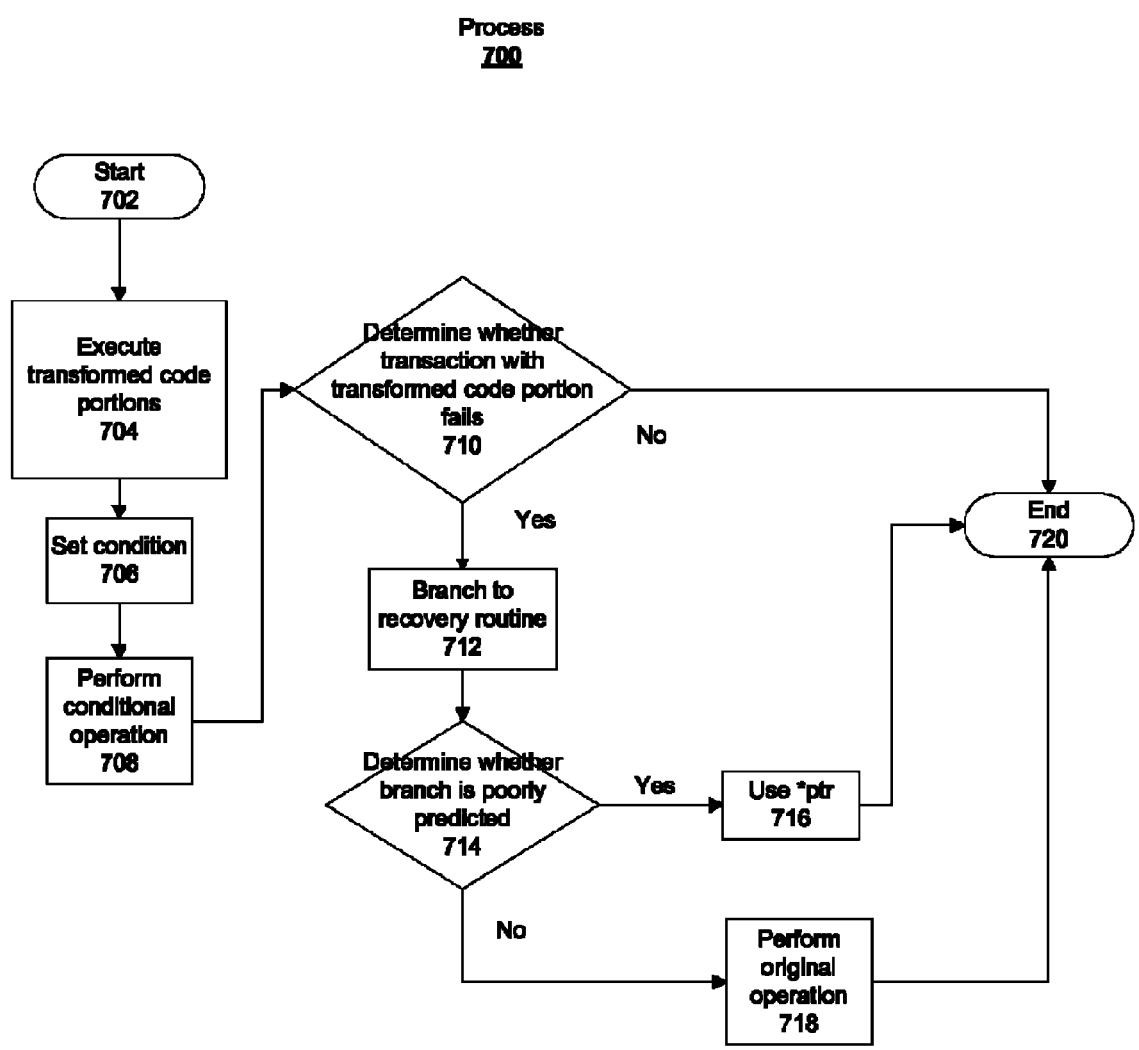
FIG. 7 is a flowchart of a process using a safe conditional operation code portion, according to some embodiments of the disclosure.

With reference to FIG. 7 a flowchart of a method using a safe conditional operation code portion as used in various embodiments of the disclosure is presented. Method 700 is an example of using a safe conditional operation code portion generated using a method as in FIG. 6. Method 700 is representative of an execution of the transformed code portions generated using method 600 of FIG. 6.

Method 700 begins (block 702) and executes transformed code portions (block 704). The transformed code portions are those segments including the conditional operation code portion of the transformed code and the respective recovery segment, including the original branching code associated with the conditional operation code portion.

During execution of the transformed code portions, method 700 sets a condition (block 706). Although setting of the condition is also performed in the transformed code, the condition is that of the original source code portion.

Method 700 processes the conditional operation code portion of the transformed code to perform the specified conditional operation (block 708). The specified conditional operation represents a first portion of the transformed code, whereas the respective recovery segment including the original branching code associated with the conditional operation code portion represents a second portion of the transformed code.

A determination is made as to whether a transaction with the transformed code portion fails (block 710). Responsive to a determination is made the transaction with the transformed code portion does not fail, method 700 terminates (block 720).

Responsive to a determination the transaction with the transformed code portion does fail; method 700 branches to a recovery routine (block 712). The recovery routine is specified within the first portion of the transformed code portion and enables a graceful exit from the failing conditional operation of the first portion, by using the original branching code as a target upon failure of the conditional operation of the transformed code.

Method 700 determines whether the branch is poorly predicted (block 714). Responsive to a determination that the branch is poorly predicted, method 700 uses *ptr as an argument of the conditional operation (block 716) and terminates thereafter (block 720). Responsive to a determination that the branch is not poorly predicted, method 700 branches out of the recovery routine to a target routine as specified in the original branching code (block 718) and terminates thereafter (block 720).

Thus is presented in an illustrative embodiment a computer-implemented method for safe conditional operation when storage access cannot be proven safe. The computer-implemented method receives a portion of source code for a transaction by an enhanced compiler and analyzes, by the enhanced compiler, the portion of source code received. A determination is made as to whether the portion of source code analyzed by the enhanced compiler is a candidate for transformation.

Responsive to a determination the portion of source code analyzed by the enhanced compiler is a candidate for transformation, the computer-implemented method transforms the portion of source code analyzed to use a conditional operation in a first portion of transformed code and adds a branch, to an original code portion, in a second portion of transformed code, where the branch is a recovery portion containing the original code portion. The recovery portion providing backward compatibility while enabling use of the transaction memory capabilities.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable data storage device having computer executable instructions stored thereon in a variety of forms. Examples of computer readable data storage devices include recordable-type media, such as a floppy disk, a hard disk drive, a RAM, CD-ROMs, and DVD-ROMs. The computer executable instructions may take the form of coded formats that are decoded for actual use in a particular data processing system.

A data processing system suitable for storing and/or executing computer executable instructions comprising program code will include one or more processors coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A computer-implemented method for safe conditional operation when storage access cannot be proven safe, the computer-implemented method comprising:
   receiving a portion of source code for a transaction by an enhanced compiler;
   analyzing, by the enhanced compiler, the portion of source code received;
   determining whether the portion of source code analyzed by the enhanced compiler is a candidate for transformation;
   responsive to a determination the portion of source code analyzed by the enhanced compiler is a candidate for transformation, transforming, by a computer processor, the portion of the source code analyzed to use a conditional operation in a first portion of the transformed code, wherein the conditional operation uses hardware transaction memory to invoke retry operations within hardware;
   wherein transforming the portion of the source code analyzed to use the conditional operation in the first portion of the transformed code further comprises specifying a recovery routine within the first portion of the transformed code;
   adding a branch, directed to an original code portion, in a second portion of the transformed code, wherein the branch is a recovery portion containing the original code portion; and
   executing a transaction comprising the first portion of the transformed code and the second portion of the transformed code.

2. The computer-implemented method of claim 1, further comprising:
   wherein the transaction comprises a branch to a recovery routine for use when the conditional operation in the first portion of the transformed code performed speculatively inside the transaction fails; setting a condition code for the conditional operation;
   loading a value at a first storage location into a second storage location when a specified condition in the conditional operation is not true using the conditional operation;
   branching out of the transaction to the recovery routine when the transaction fails; determining whether the branch is poorly predicted;
   responsive to a determination the branch is not poorly predicted, performing the original code portion; and
   responsive to a determination the branch is poorly predicted, branching out of the recovery routine.

3. The computer-implemented method of claim 2, wherein setting the condition code for the conditional operation further comprises:

retaining a condition setting code of the original source code portion.

4. The computer-implemented method of claim 2, wherein, responsive to a determination the branch is poorly predicted, branching out of the recovery routine further comprises:
using a pointer as an argument of the conditional operation.

5. The computer-implemented method of claim 1, further comprising:
using the original code portion as a target of the branch upon failure of the conditional operation of the transformed code, wherein the recovery portion enables an exit from a failing conditional operation of the first portion.

6. The computer-implemented method of claim 1, wherein transforming the portion of source code analyzed further comprises:
transforming code in a first portion, comprising a conditional operation code portion of the transformed code replacing an unconditional operation; and
transforming code in a second portion, comprising a respective recovery segment including original branching code associated with the conditional operation code portion.

7. A computer program product for safe conditional operation when storage access cannot be proven safe, the computer program product comprising a computer readable storage medium having program instructions embodied therewith, the program instructions executable by a computer processor to cause the computer processor to perform a method comprising:
receiving a portion of source code for a transaction by an enhanced compiler;
analyzing, by the enhanced compiler, the portion of source code received;
determining whether the portion of source code analyzed by the enhanced compiler is a candidate for transformation;
responsive to a determination the portion of source code analyzed by the enhanced compiler is a candidate for transformation, transforming the portion of the source code analyzed to use a conditional operation in a first portion of the transformed code, wherein the conditional operation uses hardware transaction memory to invoke retry operations within hardware;
wherein transforming the portion of the source code analyzed to use the conditional operation in the first portion of the transformed code further comprises specifying a recovery routine within the first portion of the transformed code;
adding a branch, directed to an original code portion, in a second portion of the transformed code, wherein the branch is a recovery portion containing the original code portion; and
executing a transaction comprising the first portion of the transformed code and the second portion of the transformed code.

8. The computer program product of claim 7, the method further comprising:
wherein the transaction comprises a branch to a recovery routine for use when the conditional operation in the first portion of the transformed code performed speculatively inside the transaction fails;
setting a condition code for the conditional operation;
loading a value at a first storage location into a second storage location when a specified condition in the conditional operation is not true using the conditional operation;
branching out of the transaction to the recovery routine when the transaction fails; determining whether the branch is poorly predicted; responsive to a determination the branch is not poorly predicted, performing the original code portion; and
responsive to a determination the branch is poorly predicted, branching out of the recovery routine.

9. The computer program product of claim 8, wherein setting the condition code for the conditional operation further comprises:
retaining a condition setting code of the original source code portion.

10. The computer program product of claim 8, wherein, responsive to a determination the branch is poorly predicted, branching out of the recovery routine further comprises:
using a pointer as an argument of the conditional operation.

11. The computer program product of claim 7, the method further comprising:
using the original code portion as a target of the branch upon failure of the conditional operation of the transformed code, wherein the recovery portion enables an exit from a failing conditional operation of the first portion.

12. The computer program product of claim 7, wherein transforming the portion of the source code analyzed further comprises:
transforming code in a first portion, comprising a conditional operation code portion of the transformed code replacing an unconditional operation; and
transforming code in a second portion, comprising a respective recovery segment including original branching code associated with the conditional operation code portion.

13. An apparatus for safe conditional operation when storage access cannot be proven safe, the apparatus comprising:
a communications fabric;
a memory connected to the communications fabric, wherein the memory contains computer executable program code;
a processor unit connected to the communications fabric, wherein the processor unit executes the computer executable program code to direct the apparatus to:
receive a portion of source code for a transaction by an enhanced compiler;
analyze, by the enhanced compiler, the portion of source code received;
determine whether the portion of source code analyzed by the enhanced compiler is a candidate for transformation;
responsive to a determination the portion of source code analyzed by the enhanced compiler is a candidate for transformation, transform the portion of the source code analyzed to use a conditional operation in a first portion of the transformed code, wherein the conditional operation uses hardware transaction memory to invoke retry operations within hardware;
wherein, to transform the portion of the source code analyzed to use the conditional operation in the first portion of the transformed code, the processor unit executes the computer executable program code to further direct the apparatus to specify a recovery routine within the first portion of the transformed code;
add a branch, directed to an original code portion, in a second portion of the transformed code, wherein the branch is a recovery portion containing the original code portion; and execute a transaction comprising the first portion of the transformed code and the second portion of the transformed code.

14. The apparatus of claim 13, wherein the processor unit executes the computer executable program code to further direct the apparatus to:

wherein the transaction comprises a branch to a recovery routine for use when the conditional operation in the first portion of the transformed code performed speculatively inside the transaction fails; set a condition code for the conditional operation;

load a value at a first storage location into a second storage location when a specified condition in the conditional operation is not true using the conditional operation;

branch out of the transaction to the recovery routine when the transaction fails; determine whether the branch is poorly predicted; responsive to a determination the branch is not poorly predicted, perform the original code portion; and responsive to a determination the branch is poorly predicted, branch out of the recovery routine.

15. The apparatus of claim 14, wherein, to set the condition code for the conditional operation, the processor unit executes the computer executable program code to further direct the apparatus to:

retain a condition setting code of the original source code portion.

16. The apparatus of claim 14, wherein, to branch out of the recovery routine responsive to a determination the branch is poorly predicted, the processor unit executes the computer executable program code to further direct the apparatus to:

use a pointer as an argument of the conditional operation.

17. The apparatus of claim 13, wherein the processor unit executes the computer executable program code to further direct the apparatus to:

use the original code portion as a target of the branch upon failure of the conditional operation of the transformed code, wherein the recovery portion enables an exit from a failing conditional operation of the first portion.

* * * * *